United States Patent [19]
Grossman

[11] Patent Number: 6,122,346
[45] Date of Patent: Sep. 19, 2000

[54] TELEPHONE ON-HOLD RESPONSE SYSTEM

[76] Inventor: Richard M. Grossman, P.O. Box 1028, Tualitan, Oreg. 97062

[21] Appl. No.: 08/954,146

[22] Filed: Oct. 20, 1997

[51] Int. Cl.[7] ..................................................... H04M 1/80
[52] U.S. Cl. .......................... 379/68; 379/88.16; 379/163; 379/393
[58] Field of Search ................................... 379/70, 71, 72, 379/79, 80, 84, 88.25, 201, 213, 419, 428, 429, 67.1, 68, 88.16, 156, 161, 162, 163, 387, 393

[56] References Cited

U.S. PATENT DOCUMENTS

| | | | |
|---|---|---|---|
| 2,506,279 | 5/1950 | Rowe | 379/443 |
| 3,961,142 | 6/1976 | Caffine | 379/162 |
| 4,425,479 | 1/1984 | Dubner et al. | 379/87 |
| 4,834,551 | 5/1989 | Katz | 379/68 |
| 5,003,587 | 3/1991 | Forbes | 379/393 |
| 5,095,504 | 3/1992 | Nishikawa et al. | 379/162 |
| 5,185,782 | 2/1993 | Srinivasan | 379/88.25 |
| 5,185,783 | 2/1993 | Takahashi et al. | 379/93.09 |
| 5,189,692 | 2/1993 | Ferrara | 379/88.28 |
| 5,231,657 | 7/1993 | Umemoto et al. | 455/462 |
| 5,454,031 | 9/1995 | Gray et al. | 379/106.1 |
| 5,668,861 | 9/1997 | Watts | 379/201 |
| 5,703,940 | 12/1997 | Sattar et al. | 379/201 |
| 5,764,746 | 6/1998 | Reichelt | 379/207 |
| 5,822,403 | 10/1998 | Rowan | 379/68 |
| 5,875,231 | 2/1999 | Farfan et al. | 379/67.1 |

FOREIGN PATENT DOCUMENTS

| | | |
|---|---|---|
| 285802 | 9/1996 | Taiwan . |
| WO 97/20421 | 6/1997 | WIPO . |
| WO 97/45990 | 12/1997 | WIPO . |

OTHER PUBLICATIONS

Harry Newton, Newton's Telecom Dictionary, 14th Ed., ISBN 1–57820–023–7, pp. 173, 370, 599, & 604, Mar. 1998.

*Primary Examiner*—Krista Zele
*Assistant Examiner*—Roland G. Foster
*Attorney, Agent, or Firm*—Wood, Herron & Evans, LLP

[57] ABSTRACT

A telephone on-hold system (10) allows a calling party such as a consumer (20) to place the telephone call on-hold from the consumer's handset (18C) in response to dialing a number where the receiving end (R) put the call on-hold pending availability of an agent (22). While the call is on-hold from the consumer's end, a counter-message is played to alert the agent (22) to notify the consumer's handset (18C) that the agent (22) is available, such as by depressing touch-tone keys at the agent's end (18R). The system (10) recognizes the tones and provides an alert (40) to the consumer (20) so as to allow the consumer (20) to end the on-hold status of the call from the consumer's end and undertake normal conversation with the agent (22).

38 Claims, 5 Drawing Sheets

TELEPHONE ON-HOLD RESPONSE SYSTEM

BACKGROUND OF THE INVENTION

I. Field of the Invention

The present invention relates to telephone systems and more particularly to telephone systems in which callers are put on-hold pending availability of an agent or automated attendant to take the call.

II. Description of Prior Art

One of the more frustrating problems facing both consumers and purveyors of goods and services is handling of telephone calls. As is typical, the receiving party has only so many agents or automated attendant systems available to handle calls, yet often receives many more calls than can be handled at the time. This problem is especially aggravated at peak call times such as when a television ad invites callers to call an 1-800 number for example. The result is that the calls are automatically put on-hold. The caller must sit at the phone and listen, usually to recordings trying to sell the purveyor's goods and services, or telling the customer how important her call is, until an operator or other agent (e.g., a human or an electronic system) is available to answer the call directly. Many customers are so frustrated that they simply hang up. The result is lost business opportunities for the commercial enterprise along with a possible loss of goodwill as that caller informs others of the difficulty. Even in those cases where the caller remains on the line to wait, the caller may be angry and difficult to communicate with when the agent finally does get to the call. In such cases, the result is an unhappy employee/agent for the commercial enterprise, and a less-than satisfied clientele.

Various proposals have surfaced in the past for dealing with the on-hold problem. One proposal is for the receiving telephone system to provide the caller with an estimated hold-time until that call will be answered by an agent. While this information may be helpful where the wait will be relatively short, a caller informed of a long wait might not have the time to remain on the telephone for that long a period, and so may simply hang up in frustration and come away with the feeling of being unimportant to the commercial concern.

Another proposal has been to provide the caller with the opportunity to schedule a return call from the commercial enterprise. Such a proposal is undesirable from a customer service perspective in that it fails to recognize that the timing of the initial call is already based on the convenience of the caller. Any other time is likely not as convenient and thus represents a compromise; an unacceptable compromise in those cases where the timeliness of the call is critical, such as for airline scheduling and the like. Such a scheduled callback approach also raises privacy issues for those callers who prefer not to leave their name and/or phone number merely to request information. At bottom, such systems may suggest to the caller that he should not have called when he did, even though that was the time when the consumer was motivated, and able, to call.

Another system has been proposed in which the calling party has the ability to interrupt the on-hold status of the receiving phone to alert the nearby agent to return to the phone, for example. Such a remote on-hold terminate system is of little value to consumers put on-hold automatically upon receipt of their call, or where no agent is readily available when alerted.

There thus remains an ongoing problem both for consumers and commercial concerns in dealing with the natural peaks and valleys in the inevitable flood of calls in relation to the number of agents available to handle the calls.

SUMMARY OF THE INVENTION

The present invention provides an on-hold response system that is in the control of the caller (referred to hereinafter as the "consumer") and which can alleviate the frustration and tedium of being put on hold by a receiving party. To this end, and in accordance with one aspect of the present invention, the consumer is provided with the ability to place the call on-hold so that both ends of the call are in the on-hold state. While the dual on-hold state is in progress, the consumer may leave (and/or hang up) the telephone and get back to other activities. When the consumer or calling party puts the system on-hold, a counter-message may advantageously be produced to the receiving telephone. When the agent finally answers the call, the receiving phone is taken off-hold (i.e., the on-hold status of that phone is terminated). The agent will hear the counter-message so as to be notified that the consumer is on-hold and awaits the agent. The consumer is then notified to return to the phone, such as by a beep, a ringing of the sending telephone, or other audible or visual indicator. The consumer may then pick up the phone and terminate the caller on-hold status thus restoring the telephone system to normal communications mode, confident that an agent will be on the other end of the line ready to take the call.

The caller on-hold response system of the present invention may take several forms. By way of example, the receiving agent may be instructed in the counter-message to depress any (or selected) touch-tone key(s) on the agent's telephone. Receipt by the response system of the characteristic touch-tone signals thus generated is an indication that the receiving party is now available. Alternatively, when the agent answers at the receiving phone, a characteristic of the telephone system may change, or a characteristic signal may be generated onto the telephone lines. The caller on-hold response system of the present invention may monitor for that characteristic as an indication that the receiving party is now available. In either case, the consumer is notified of the response such as by a re-ringing of the telephone or by a buzzer or other audible or visual indicator. The consumer may then return to the telephone and disable the caller-on-hold status thus restoring the telephone system to normal communications mode.

Termination of the caller on-hold status may be accomplished automatically, such as in response to the consumer taking his phone off-hook, or may be accomplished at the control of the consumer such as by actuation of a switch provided for that purpose or by depression of selected touch-tone key(s) on the consumer's phone.

The caller on-hold response system of the present invention may be provided by circuitry installed at the calling party's location either as a separate unit plugged into a telephone jack outlet or may be built in as part of otherwise commercially available telephone equipment such as a telephone handset or an answering machine. Alternatively, the system may be provided in the circuitry of telephone electronic switching systems such as in use in telephone Central Offices, or other telephone systems (e.g., key, PBX or hybrid) such as may be in use at either the receiving or calling party's location.

By virtue of the foregoing, there is thus provided a caller on-hold response system which is in the control of the consumer and which can alleviate the frustration and tedium of being put on hold by a receiving party.

These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate embodiments of the invention and, together with the general description of the invention given above and the detailed description given below, serve to explain the principles of the invention.

DETAILED DESCRIPTION OF THE DRAWINGS

Figure 1:
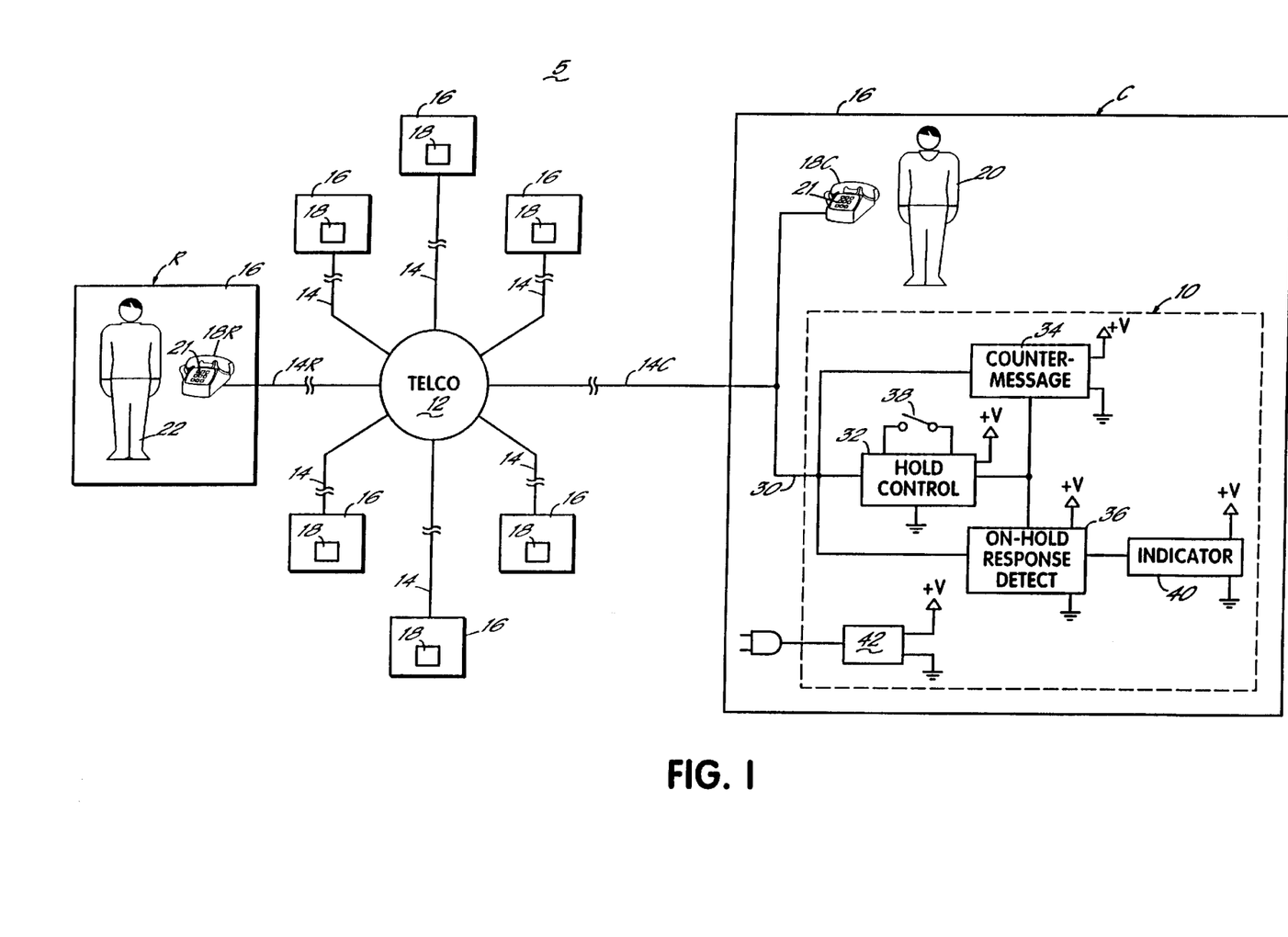
FIG. 1 is a schematic representation of a telephone system incorporating a first embodiment of a caller on-hold response system in accordance with the principles of the present invention.

With reference to FIG. 1 there is shown a schematic representation of a telephone system 5 incorporating a first embodiment of a caller on-hold response system 10 according to the principles of the present invention. Telephone system 5 includes a typical telephone Central Office 12 which includes the various switching controls and the like (not shown) necessary to establish telephone call connections. Central Office 12 is coupled to a plurality of telephone transmission links 14 (e.g., copper wire lines, fiber-optic cables, and/or wireless or cellular connections), each of which in turn is coupled to a respective user station 16. As will be readily appreciated, a user station 16 may be a house, an office building, a telephone booth or even a portable or cellular site, all by way of example and not limitation, and includes at least one telephone handset 18, as is conventional. Furthermore, Central Office 12 could be an internal control system such as for a business telephone system. Moreover, while only eight links and stations are shown, it will be appreciated that hundreds and even thousands may be involved, especially in public telephone systems as are commonplace in the United States.

Any of the many user stations 16 may be attempting to call a specified user station 16, identified herein as receiving station R. By way of example, a consumer 20 at one of user stations 16 identified herein as consumer or calling station C will take the telephone handset 18C thereat off-hook to seize link 14C to the Central Office 12. Consumer 20 will then dial receiving station R (such as by depressing touch-tone keys 21 on handset 18C as is conventional). Rather than be connected to an agent 22 at receiving station R such as via link 14R, however, consumer 20 may be put on-hold, especially where the receiving station R is a business or a centralized call-in location such as an 800 or 888 number service. When that occurs, to continue with the call, the consumer may either await availability of the agent as is conventional, or may employ the caller on-hold response system 10 of the present invention as will now be described.

Caller on-hold response system 10 may be contained within a common box or housing as exemplified by the dotted line in FIG. 1. System 10 is coupled to the same telephone link 14C as is consumer's telephone handset 18C. The input 30 of system 10 couples telephone link 14C to a hold control circuit 32, which in turn is coupled to counter-message circuit 34 and on-hold response detect circuit 36, both of which are also coupled to input 30 and, hence, link 14C. When consumer 20 is put on-hold from the remote end, because the link 14R to receiving station R is busy or in use, for example, consumer 20 may activate system 10 by actuation of the hold control circuit 32 (such as by closing a switch 38 associated therewith). With hold control circuit 32 actuated, telephone line 14C is "seized" with an appropriate impedance thereacross to cause the central station 12 to keep the connection between stations R and C intact, even if handset 18C is hung up (i.e., placed on-hook). With circuit 32 activated, caller 20 has caused the connection to be placed on-hold from the caller's end as well.

Activation of circuit 32 also activates counter-message circuit 34 and on-hold response circuit 36. Counter-message circuit 34 contains a predetermined message by which to advise the agent that the caller has placed the call on-hold awaiting availability of the agent. The agent may be further instructed to enter a code (such as by depressing any or specified ones of the touch-tone keys 21 on handset 18R) to return consumer 20 to the telephone. Circuit 34 may be an all solid state device with memory for storing the counter-message electronically, or may be a message playback device such as a tape player or other audio play device which contains a recorded counter-message, or a combination of the foregoing.

When activated, circuit 34 causes the counter-message to be impressed or injected onto telephone link 14C and to be available to be heard at either of handset 18C and receiving station handset 18R when in the off-hook state. Thus, when the agent 22 at station R finally answers the call by taking handset 18R off-hook (when coupled to link 14C), agent 22 will hear the counter-message. Upon depression of the appropriate key(s) 21 by agent 22, the dual-tone-multi-frequency signals ("DTMF") characteristic thereof will be impressed onto telephone link 14R and coupled to link 14C via Central Office 12. The DTMF signals are also coupled to on-hold response detect circuit 36 which decodes same. If the proper key(s) were depressed, circuit 36 recognizes that as a signal that agent 22 is now available and on the line for consumer 20 to talk with. Consequently, detect circuit 36 will cause an indicator 40 to be energized to alert consumer 20 to the availability of agent 22. Indicator 40 may be a beeper, buzzer or other audible signaling device, a visual indicator such as an LED or light bulb, or a combination of the foregoing. In the case of a visual indicator, the indication may be created by causing the indicator to blink on and off.

In response to the indicator being energized, consumer 20 may return to handset 18C to complete the communication with the agent as had been originally planned. To this end, upon returning to the telephone, consumer 20 will take handset 18C off-hook (if it was previously hung up) and will also deactivate hold control circuit 32 (such as by opening switch 38). At that time, circuits 34 and 36 are deactivated (and indicator 40 turns off) such that link 14C is no longer seized by system 10. Consequently, the connection between stations R and C via links 14C and 14R is maintained, for example, by handsets 18C and 18R remaining off-hook, as is conventional.

System 10 may be powered directly from telephone link 14C (such as with the circuitry shown in U.S. Pat. No. 5,454,031, the disclosure of which is incorporated herein in its entirety by reference), or by other techniques. For example, system 10 may be unpowered until control circuit 32 is activated in which event power may be derived from link 14C only when the connection is established to central station 12 whereat a greater level of energy is available on link 14C than when the link 14C is not established (as when the telephone 18C is not in use). Alternatively, system 10 may be powered locally such as with a conventional power supply 42 plugged into an electrical outlet (not shown) and/or a battery (also not shown), and either connected at all times, or only when circuit 32 is activated. In the latter case, power terminal +V may be coupled to the rest of system 10 via a switch element (not shown) ganged with switch 38.

While switch 38, and indeed system 10 as a whole, are shown as a housing separate from handset 18C, they may be incorporated into a telephone device such as a telephone answering machine or telephone handset 18C' with switch 38 thus being defined by the hold button (not shown) which is conventional on many telephones. To this end, as shown diagrammatically in FIG. 2, handset 18C' defines the housing for system 10 and includes a base 42 supporting the keypad 21 and a handpiece 43. Tip and ring lines of link 14C are coupled to telephone circuitry 44 within base 42 which circuitry is electrically coupled to keypad 21, handpiece 43 and cradle switch 45 as is conventional. Hold switch 46 may also be supported on base 42 and coupled to circuitry 44 in conventional manner. The hold switch 46 and circuitry 44 operate in conventional manner and may be tied to caller on-hold response system 10 also mounted within base 42 so as to provide the function of hold control circuit 32 and switch 38 of system 10. Although base 42 and handpiece 43 are shown as separate components, it will be readily appreciated that they could form one housing. Also, an indicator 40 may be mounted on base 42. Alternatively, system 10 may inject a ringing tone into circuitry 44 to cause phone 18C to ring (if handpiece 43 is on the cradle switch 45) or to inject an audible tone into handpiece 43, if handpiece 43 is off of cradle switch 45.

In addition to the foregoing, detect circuit 36 (FIG. 1) may be adapted to detect other characteristic signals on link 14C besides DTMF signals. To this end, Central Office 12 may operate with a variety of characteristic signals which are utilized to indicate various conditions of the connection between stations 16. One such signal may be indicative that a receiving party has placed the call on-hold. That characteristic signal may be terminated or altered, or replaced with another signal, when the receiving party goes off-hold. Circuit 36 may be adapted to detect the termination, alteration or new signal as a characteristic signal to energize indicator 40. Further alternatively, indicator 40 may be coupled to link 14C to impress on link 14C a ringing frequency signal so as to cause handset 18C to ring (if on-look) or sound in the handset (if off-hook) to alert consumer 20 to the availability of agent 22.

In use, consumer 20 will utilize telephone 18C to place a call to a purveyor of goods or services. When consumer 20 is placed on hold, consumer 20 activates system 10 causing a counter-message to be played over the telephone connection (e.g., links 14C and 14R via Central Office 12). When the receiving party (e.g., agent 22) answers phone 18R, agent 22 hears the counter-message and activates the caller on-hold response either manually by impressing a characteristic signal on the line (such as by depressing the appropriate key(s) 21 on handset 18R) or automatically by affecting some other characteristic signal when handset 18R is taken off-hook. Circuit 36 detects the characteristic signal(s) caused thereby and initiates indicator 40. Responsive thereto, consumer 20 deactivates circuit 32 (and hence, system 10) and utilizes handset 18C to engage in discussions or other communication with agent 22 at the receiving end R.

Figure 3:
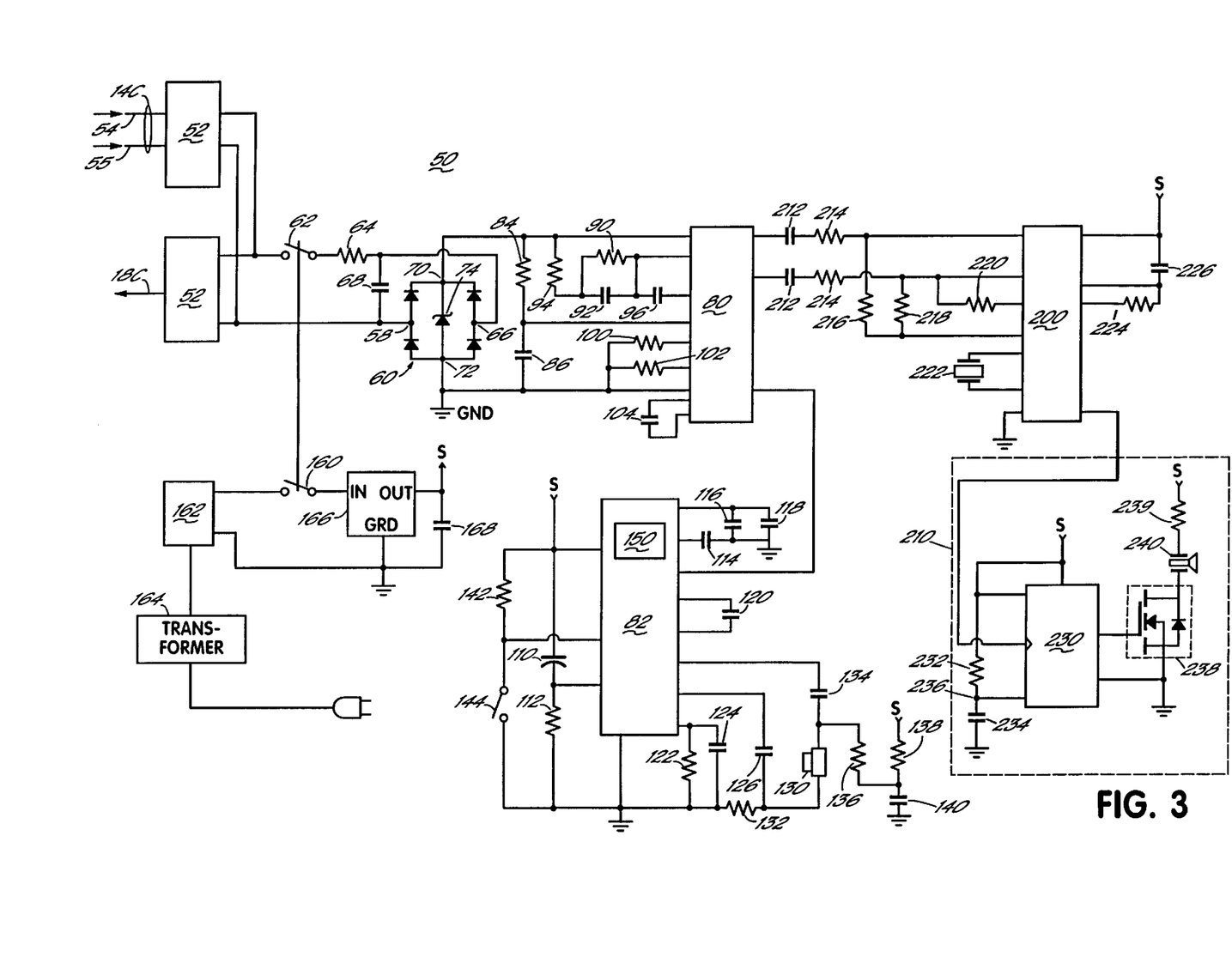
FIG. 3 is a schematic representation of a second embodiment of a caller on-hold response system.

It will be readily appreciated that system 10 as shown in FIG. 1 may be realized with discrete components, a computer system such as one or more microprocessors programmed to achieve the circuitry and functionality of system 10, or a combination of the foregoing. With reference to FIG. 3, there is shown a second embodiment of a caller on-hold response system 50 according to the principles of the present invention and realized with discrete components. System 50 includes a pair of conventional RJ45 jacks 52 wired in parallel to couple to the ring and tip lines 54,55 of a conventional telephone link 14C and to handset 18C, respectively, so as to substitute for system 10 of FIG. 1. Tip line 55 (or, alternatively, ring line 54) is coupled directly to one input 58 of full-wave bridge rectifier circuit 60, with the ring line 54 (or, alternatively, tip line 55) coupled via on-hold switch 62 and ten ohm resistor 64 to the other input 66 of rectifier 60. Inputs 58 and 66 are also capacitively coupled via 0.01 μF capacitor 68. Coupled across the outputs 70,72 of rectifier 60 is an 18 volt, one watt zener diode 74. Rectifier 60 and/or zener diode 74 cooperate to seize link 14C and place the telephone connection in the on-hold status from the calling end when switch 62 is closed. Thus, when consumer 20 at phone 18C makes a call and is placed on-hold at the receiving end R, consumer 20 closes switch 62 which causes the telephone connection to be placed into the on-hold mode at the consumer's end. Also, while switch 62 is closed, a counter-message may be impressed onto ring and tip lines 54,55 by cooperation of telephone speech circuit 80 (which may be a TP5700A integrated circuit chip available from National Semiconductor) and voice record/playback circuit 82 (which may be an ISD1420 ChipCorder integrated circuit chip available from Information Storage Devices or ISD, Inc. in San Jose, Calif.). The counter-message is recorded in circuit 82.

For reference purposes, output 72 of rectifier 60 is taken as system ground or GND. Output 70 serves as the power rail for circuit 80 and, in cooperation with output 72, serves as the gateway for DTMF signals into system 50 and for outputting the counter-message onto link 14C when switch 62 is closed. To these ends, output 70 is coupled to the power supply input (pin 13) of circuit 80 with the negative supply input (pin 3) being coupled directly to GND. Also, the bias input (pin 15) thereof is coupled to output 70 via 620Ω resistor 84 and to GND via 100 μF capacitor 86. Sidetone cancelling input (pin 4) of circuit 80 is coupled via the parallel circuit of 4.7 KΩ resistor 90 and 0.01 μF capacitor 92, both in series with 1.5 KΩ resistor 94, to output 70, which in turn is coupled back therethrough via 0.047 μF capacitor 96 to AGC amplifier input (pin 12) of circuit 80. A 68Ω, one watt resistor 100 couples the RDC input (pin 14) to GND and 1 KΩ resistor 102 couples the AGC control input (pin 16) to GND. The XDI and XDO inputs (pins 5 and 6) are capacitively coupled together via 0.22 μF capacitor 104.

To facilitate injection of the counter-message onto link 14C, the microphone input (pin 7) of circuit 80 is coupled to at least one of the audio amplifier outputs (e.g., pin 14 or 15) of circuit 82, with the positive output (pin 14) being selected in the embodiment of FIG. 3. In the embodiment shown in FIG. 3, several address buffer inputs (pins 1–3, 5, and 6), clock input (pin 26), and ground busses (pins 12 and 13) are connected directly to GND (all represented by one connection in FIG. 3 for sake of simplicity). Other address buffer inputs (pins 4, 9 and 10) and level playback input (pin 23) are coupled directly (also as represented by one connection for sake for simplicity) to a source of supply (such as power rail S), and capacitively coupled via 1 $\mu$F capacitor 110 to edge playback input (pin 24). The edge playback input is in turn resistively coupled to GND via 100 K$\Omega$ resistor 112. Power busses (pins 28 and 16) are capacitively coupled to GND via 0.1 $\mu$F capacitors 114 and 116, with one of the busses (pin 28) being further coupled to GND via parallel 22 $\mu$F capacitor 118.

Circuit 82 also includes analog input (pin 20) and analog output (pin 21) which are capacitively coupled together via 1 $\mu$F capacitor 120. AGC input (pin 19) is coupled to GND via the parallel circuit of 470 K$\Omega$ resistor 122 and 4.7 $\mu$F capacitor 124. A microphone input of circuit 82 (pin 17) is capacitively coupled via 0.22 $\mu$F capacitor 126 to a microphone 130 and via 10 K$\Omega$ resistor 132 to GND. Microphone 130 is in turn coupled to a reference input (pin 18) of circuit 82 via 0.22 $\mu$F capacitor 134 and to 10 K$\Omega$ resistor 136. Resistor 136 is coupled to supply rail S via 2 K$\Omega$ resistor 138 and to GND via 220 $\mu$F capacitor 140. Finally, record input (pin 27) is coupled to supply rail S via 4.7 K$\Omega$ resistor 142 and selectively coupled to GND via normally open record switch 144.

When circuit 82 is activated, such as when supplied with power from power rail S as will be described, circuit 82 plays out over its output (e.g., pin 14) an analog signal containing a message that has been prerecorded into the memory array 150 contained in circuit 82. The message repeats based on the circuitry as above-described until circuit 82 is deactivated (such as by terminating power to rail S). The repeating message is coupled to circuit 80 to be injected onto ring and tip lines 54,55 through rectifier 60 so as to be heard by an agent 22. By way of example, the message may be up to 20 seconds long as follows: "This call is very important to your caller; however, your caller had to leave the phone briefly and has employed this on-hold response system to hold the line. Please press any key to notify the caller you are now available. Thank you."

The message stored in array 150 may be preprogrammed at the factory and/or may be altered in the field to suit the consumer's wishes as will now be described. To this end, when a new (or the first) message is to be placed into circuit 82, power is supplied to rail S and the user (e.g., consumer 20 in FIG. 1) closes switch 144 to activate the record mode of circuit 82. With switch 144 depressed, the user recites the desired message into microphone 130 to be stored into array 150 as it is recited. When the desired message is completed, the user simply returns switch 144 to its open state (e.g., by letting go of the switch) which results in the new message being latched into array 150 for subsequent playback when circuit 82 is activated.

While circuit 80 may be powered from the phone line 14C via rectifier 60 and zener diode 74, circuit 82 may be either powered therefrom or, advantageously, powered from a separate power supply. To this end, switch 62 may also be ganged with a power supply switch 160 such that when system 50 is placed into the on-hold mode, power is coupled to circuit 82 to cause the pre-recorded message contained therein to be generated and played out over the telephone lines. A connector 162 may be provided to couple a power transformer 164 connected to an electrical outlet (not shown) for energizing voltage regulator chip 166. Voltage regulator 166 may be a conventional 78L05 five-volt regulator chip, the input of which is selectively coupled to transformer 164 via switch 160, and the ground of which is coupled to the transformer and to GND of system 50. The output of chip 166 is a nominal voltage such as 5 volts to provide power to supply rail S. Supply rail S may be decoupled to GND via 0.1 $\mu$F capacitor 168 connected between GND and the output of chip 166, as is conventional.

In response to the counter-message played out of array 150 of circuit 82, an agent at the receiving end is prompted to depress a touch-tone key. The DTMF signal generated thereby is coupled over the telephone connection to ring and tip lines 54,55 of link 14C whereat system 50 may detect same. To this end, the DTMF signal is coupled via rectifier 60 and circuit 80 to DTMF receiver 200 (such as an M-8870 integrated circuit chip available from Teltone Corporation in Bothell, Wash.). Receiver chip 200, which is also powered from rail S when switch 160 is closed, decodes the signals received at ring and tip lines 54,55 as amplified by circuit 80 for touch-tone DTMF signals. Presence of the characteristic (s) of any such signals is taken as an indication that the agent's phone 18R has been taken off-hook and is connected to link 14C for communication with the receiving end, and the on-hold status is ready to be terminated at the caller's end C. Upon detection of any pair of DTMF signals corresponding to known touch-tone keys, circuit 200 outputs an enable signal (from pin 15) to activate an indicator circuit 210 as will be described.

As seen in FIG. 3, amplifier outputs (pins 1 and 2) of circuit 80 are coupled to amplifier inputs (pins 1 and 2) of DTMF receiver circuit 200 via respective series circuits each comprised of 0.01 $\mu$F capacitor 212 and 100 K$\Omega$ resistor 214. The positive and negative amplifier inputs (pins 1 and 2) of circuit 200 are further coupled to a reference line (pin 4) of chip 200 via respective 37.5 K$\Omega$ and 60 K$\Omega$ resistors 216 and 218. The negative amplifier input (pin 2) is further coupled via 100 K$\Omega$ resistor 220 to the amplifier output (pin 3) for gain control as will be readily appreciated. Circuit 200 has an oscillator circuit controlled by 3.579 MHZ crystal 222 coupled between the oscillator ports (pins 7 and 8). The negative supply inputs (pins 5, 6 and 9) are coupled to GND while the positive supply input (pin 18) and output enable line (pin 10) are tied directly to power supply rail S (only one connection to each of GND and S being shown for sake of simplicity). Additionally, early steering input (pin 16) is coupled by 300 K$\Omega$ resistor to 0.1 $\mu$F capacitor 226 which is connected to rail S, while steering control input (pin 17) is coupled to rail S via capacitor 226. All other inputs or outputs of circuits 80, 82 and 200 are simply left open.

When circuit 200 detects an appropriate characteristic signal, such as touch-tone DTMF signals, the consumer 20 should be notified that agent 22 is ready to take the call. To this end, the delayed steering output (pin 15) of circuit 200 transmits an enable signal to indicator circuit 210 to generate an alert signal such as a buzzing or beeping sound. To this end, circuit 210 includes a D-type flip-flop 230 (also powered from rail S) such as a 74LS74A chip with the clock input (pin 3) thereof receiving the enable signal. Also, the D input (pin 2) and the preset input (pin 4) of flip-flop 230 are tied directly to rail S, and coupled to GND via the series circuit of 10 K$\Omega$ resistor 232 and 120 $\mu$F, six volt (or greater) capacitor 234. The node 236 of elements 232 and 234 is tied to the clear input (pin 1) of flip-flop 230. The Q output (pin 5) of chip 230 is coupled to BS-170 FET transistor switch 238 which, when activated, closes to provide a current path from rail S, through resistor 239 (which may be a jumper), beeper 240, and to GND so as to sound beeper 240. As a consequence, upon being powered up (switch 160 closing by the consumer 20 activating system 50), flip-flop 230 is reset so that switch 238 is off and buzzer 240 does not sound. In response to the characteristic signal(s) from agent 22 terminating the on-hold status of the call at telephone 18R, circuit 200 transmits an enable signal to chip 230 which changes state and turns on switch 238 thereby energizing buzzer 240 to sound. The consumer will then know to return to the phone (18C), disable the caller on-hold response system 50 (by opening switch 62) and engaging in normal conversation with agent 22.

Use of the system 50 of FIG. 3 is like that for system 10 as previously described. Beeper 240 may be replaced with a buzzer, visual indicator or combination thereof as desired. Further, system 50 may be included within handset 18C by appropriate wiring and related modifications as in the case of system 10 in handset 18C' of FIG. 2. As an enhancement to the systems of FIGS. 1 and 3, it may be desirable to limit notification of the agent's availability only to those cases where the agent depresses a selected sequence of touch-tone keys 21 at the agent's phone 18R by appropriate modification to the circuitry as will be readily apparent to one skilled in the art.

Figure 2:
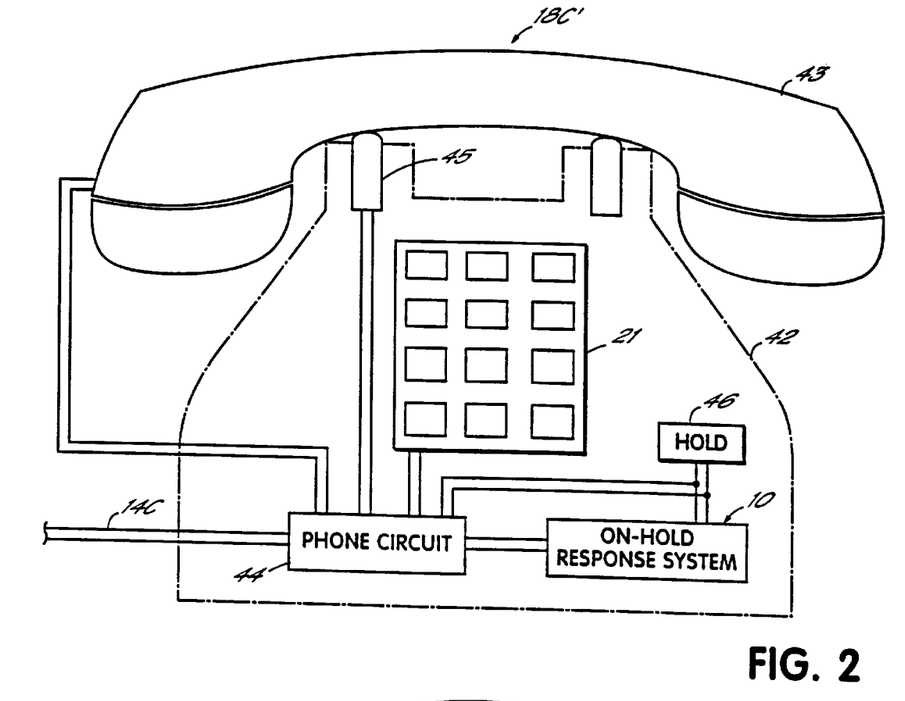
FIG. 2 is a diagrammatic view of a telephone handset incorporating the caller on-hold response system of FIG. 1.
Figure 4:
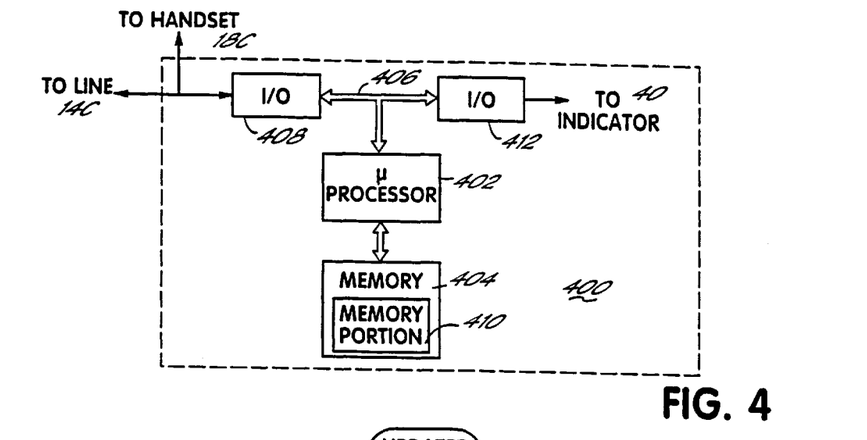
FIG. 4 is a diagrammatic schematic of a program-controlled caller on-hold response system similar to FIG. 1.

As above described, systems 10 and 50 are utilized at the consumer's station C, either as a separate box as in FIG. 1 or as part of the handset as in FIG. 2. In either case, discrete circuitry may be employed or computer systems such as a microprocessor-based system may be employed as will be readily recognized by those skilled in the art. To this end, and with reference to FIG. 4, a computer system 400 includes a microprocessor 402 operating under program control of memory 404 which has been programmed to provide some or all aspects of the caller on-hold system functionality such as that described with respect to system 10, including at least the counter-message and on-hold response detect functionality. In this regard, microprocessor 402 communicates over I/O bus 406 via I/O interface device 408 to line 14C and handset 18C for hold control, to emit the counter-message (stored in memory portion 410 of memory 404), and to receive the on-hold response characteristics, for example. When the characteristics are received from I/O device 408, processor 402 is operated to generate the appropriate signals onto bus 406 to activate I/O interface device 412 to energize indicator 40 to alert the caller to the availability of the agent (or to cause the handset 18C to ring via I/O device 408, if memory 404 is so-programmed). Memory portion 410 of memory 404 may be a fixed program, or may be reprogrammable such as via touch-tone key commands or speech/voice command from handset 18C through I/O device 408 as will be readily appreciated. Alternatively, memory portion 410 may be reprogrammable through a conventional infra-red interface, not shown. Additionally, memory portion 410 may include a default counter-message that may be restored by command from the handset 18C, should the user wish to undo changes made to the message.

Figure 5:
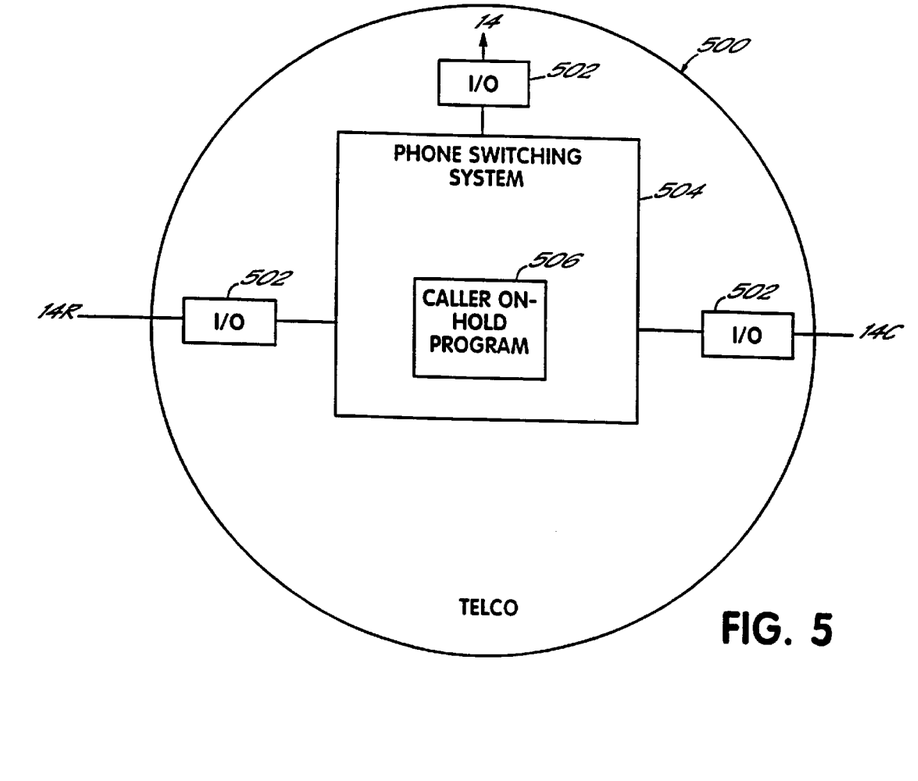
FIG. 5 is a diagrammatic schematic of a program-controlled caller on-hold response system implemented in a telephone Central Office.

Alternatively, a programmed operation may be set up in the telephone Central Office by which to provide the functionality of the caller on-hold response system. In the latter event, the central Office 500, as shown diagrammatically in FIG. 5, has a plurality of I/O interface connections 502 (only three shown) to connect the various phone lines 14 to the phone switching system 504. The microprocessors or other computers utilized by the telephone Central Office switching system 504 may be programmed as at 506 much the same way that the microprocessor version 400 (or a program-controlled version of system 10 or 50) would be programmed as will now be described with reference to FIGS. 6 and 7.

Figure 6:
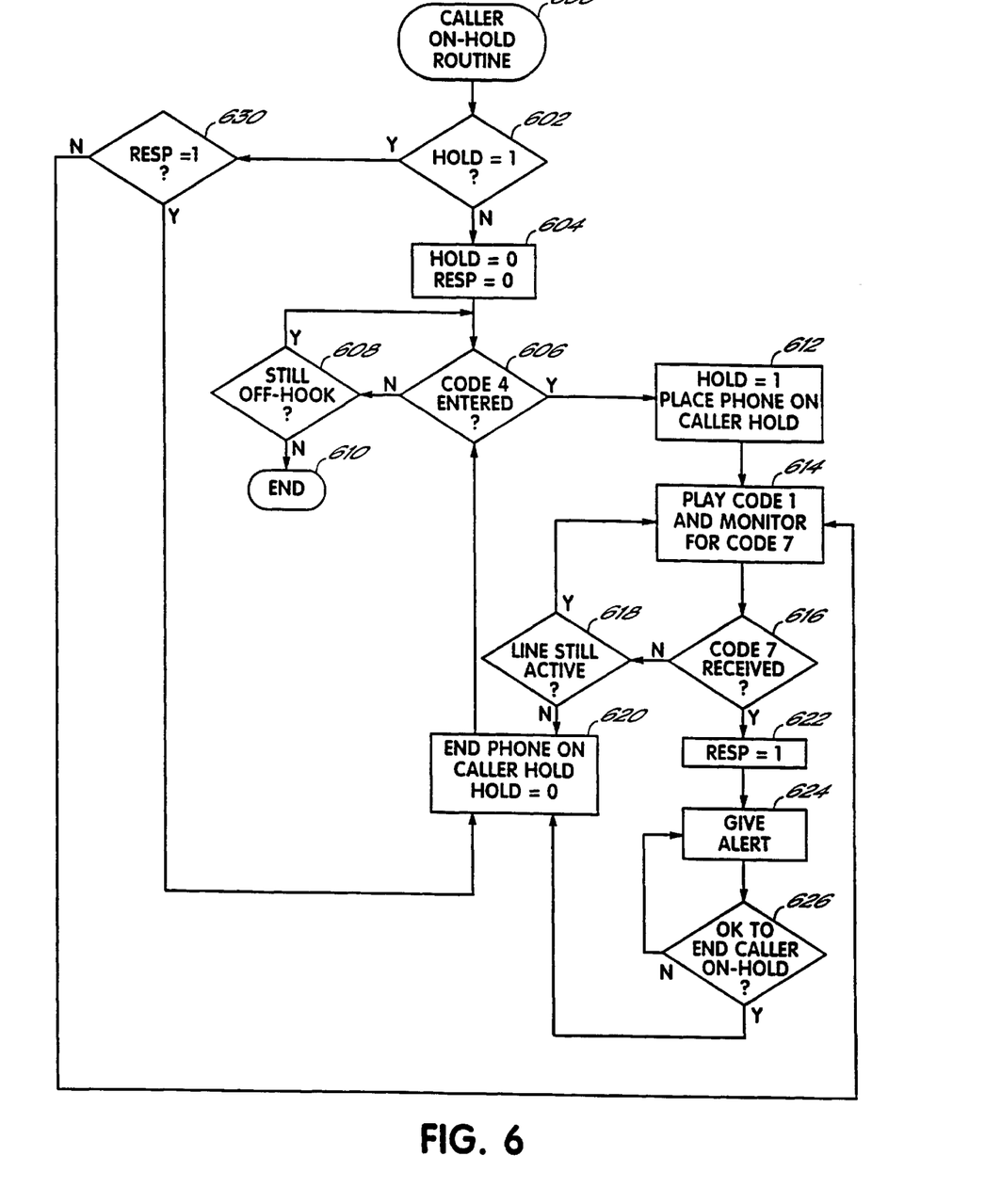
FIGS. 6 and 7 are flow charts describing a program controlled operation of the program-controlled caller on-hold response systems of FIGS. 4 and 5 in accordance with the principles of the present invention.

FIG. 6 is a flow chart diagram of the procedural steps undertaken by a computerized system programmed to provide the caller on-hold response system functionality of the present invention. The process shown in FIG. 6 includes the ability to alter control codes for placing the system on-hold by the consumer and/or terminating the on-hold status of the call, such as with the touch tone keys 21 (FIGS. 1 and 2), and a programmed system for changing the counter-message as desired. More specifically, whenever phone 18C is taken off-hook (or a connection is established with the Central Office 12, or Central Office 500 via link 14C if the programmned operation of FIG. 6 is in the Central Office), the process of FIG. 6 begins at step 600 and proceeds to step 602 to determine whether the consumer has already placed the call on-hold from the calling end by testing the Hold flag. If at step 602 the system was not previously placed into the on-hold mode (Hold does not equal 1), such as when a phone call is first placed with handset 18C, the sequence proceeds from step 602 to step 604 whereat the Hold and Response flags are reset to 0 (zero). The sequence then proceeds to step 606 whereat it is determined whether the consumer wishes to place the call on-hold from the caller's end. This check is made by examining phone line 14C for entry of the on-hold code (referred to herein as Code 4). Although Code 4 is advantageously created by using the touch tone keys 21 on handset 18C, Code 4 may alternatively be created by closing of a separate hold switch as in the case of system 10. If Code 4 is not detected, the sequence will loop back to step 606 through step 608 if phone 18C is still off-hook to continue monitoring for the on-hold code. If at step 608, phone 18C is placed back on-hook, i.e., phone 18C is hung up, then the call is considered terminated and the sequence ends at step 610.

Once Code 4 is detected at step 606, meaning the caller wishes to place the call on-hold, the sequence proceeds to step 612 whereat the call is placed on-hold from the caller's end 18C (such as by, in effect, closing a switch like switch 38 of system 10), and the Hold flag is set equal to 1. The sequence then proceeds to the combined steps of 614 and 616 whereat the counter-message (referred to herein as Code 1) is played and line 14R is monitored for the response code from the receiving end 18R to indicate that the agent is now available to take the call. If the response code, referred to herein as Code 7, is not received at step 616, the sequence loops back to repeat steps 614 and 616 until the response code is detected. The sequence may also include a fail-safe step 618 which monitors the telephone lines 14C/14R to be sure the connection is still made before repeating steps 614/616. If not, the phone 18C is taken off-hold at step 620, the Hold flag reset to 0, and the sequence reverts back to step 606 as if a new call were being placed. If, however, the lines are still active at step 618, the sequence loops back to steps 614/616 as above-described.

Upon receipt of Code 7 at step 616, the sequence proceeds to step 622 to set the Response flag (Resp=1), and the alert tone or other indicator (e.g., ringing of phone 18C) is given at step 624 to alert the caller that the agent is now available. The sequence proceeds to step 626 whereat it is determined whether the on-hold status from the caller's end is to be terminated (such as by detecting re-entry of Code 4 a second time, or detection of some other indicator or lapse of time, as desired). The sequence loops between steps 624 and 626 until the caller is ready to take the call, at which time the sequence proceeds to step 620 to take phone 18C off-hold (and set the Hold Flag=0), and return to step 606 for the next entry of the on-hold status code (Code 4) whereat normal communications may be held.

As will be appreciated, once the on-hold code is detected at step 606, the sequence will continue to operate as long as the phone lines are active (step 618) or until the response code is received (step 616). The caller may, however, place phone 18C on-hook during that time. To this end, whenever the phone is taken off-hook the sequence also begins to repeat at step 602. In such a case, at step 602, the system will already be in the caller on-hold mode (Hold=1) and so the sequence will automatically proceed to step 630 whereat the status of the Response flag is tested. If at step 630 the Response flag is still 0, the sequence jumps to step 614 to continue playing the counter-message and monitoring for the response code. If, however, the response code had already been received (Resp=1), then the sequence will jump from step 630 to step 620 to end the on-hold status and allow normal communications to proceed.

Figure 7:
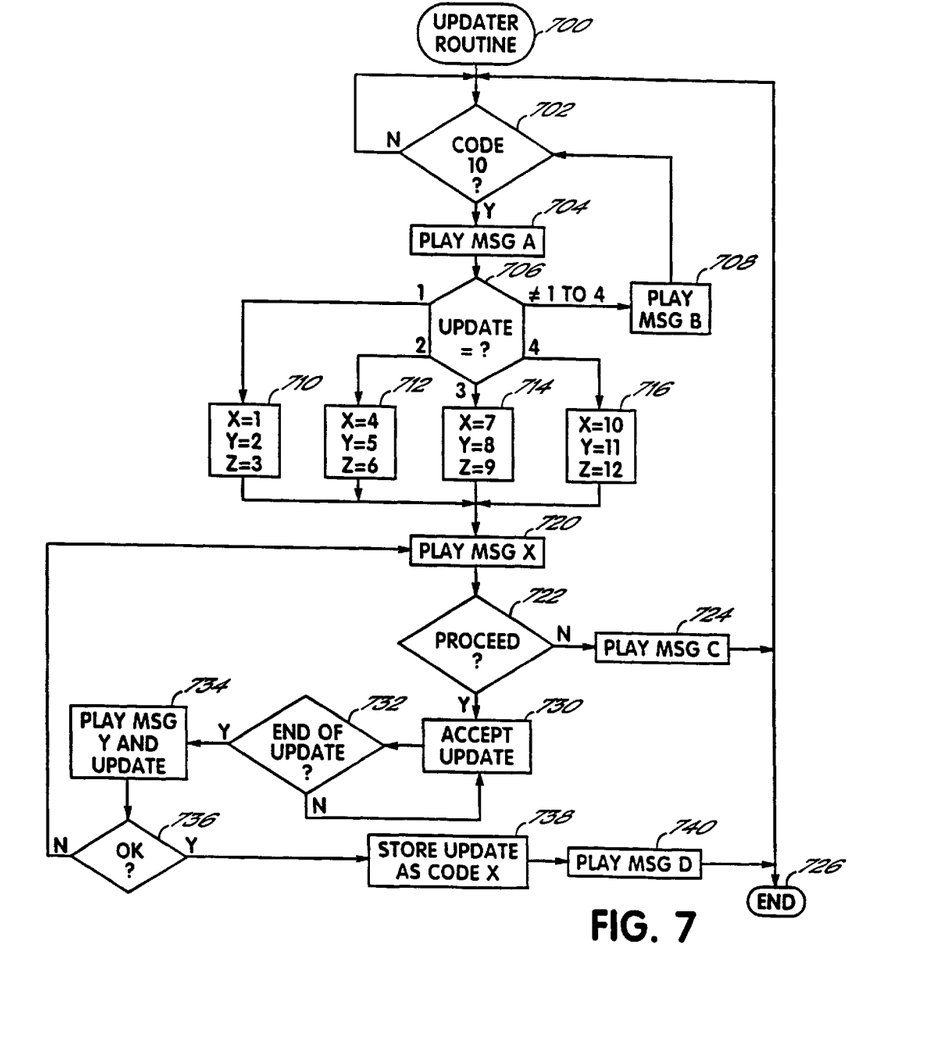

In addition to the foregoing, whenever phone 18C is off-hook, for example, a subsidiary sequence set forth in FIG. 7 may be undertaken for purposes of changing the counter-message and/or other codes involved in the sequence of FIG. 6. To this end, whenever phone 18C is off-hook (or a switch, not shown, is closed to enable the routine), the sequence of FIG. 7 starts at step 700 and proceeds to step 702 whereat line 14C is monitored for the presence of a code assigned to the caller, such as a PIN code (referred to herein as Code 10). It will be appreciated that Code 10 may be some other code or switch closure. The sequence continues thereat until (if at all), Code 10 (such as the PIN code) is detected. If so, the sequence proceeds to step 704 to play a preprogrammed message (MSG A) over line 14C to be heard on phone 18C, such as to advise the caller that they have activated the updater system and to enter a number for the item to be updated. In the embodiment of FIG. 7, the number to be entered (at the touch tone buttons 21), is 1 for the Counter-message; 2 for the on-hold code; 3 for the response code; and 4 for the PIN code. The number entered is detected at step 706 and the sequence proceeds to the appropriate step based thereon. If the entry is not a valid entry (e.g., not one of the numbers 1 through 4), then the sequence proceeds to step 708 whereat a further preprogrammed message (MSG B) may be played advising the caller that the number is not valid and again requesting the PIN code to restart the procedure.

Depending upon the entry at step 706, the sequence proceeds to step 710 (if the entry was 1) whereat the x, y and z flags are set equal to 1, 2 and 3, respectively; to step 712 (if the entry was 2), whereat the x, y and z flags are set equal to 4, 5 and 6, respectively; to step 714 (if the entry was 3), whereat the x, y and z flags are set equal to 7, 8 and 9, respectively; or to step 716 (if the entry was 4), whereat the x, y and z flags are set equal to 10, 11 and 12, respectively. After setting of the flags at one of steps 710, 712, 714, and 716, the sequence proceeds to step 720 whereat a message (MSG X) is played to identify the item to be updated (MSG 1 will advise that the counter-message is to be updated; MSG 4 will advise that the on-hold code is to be updated; MSG 7 will advise that the response code is to be updated; and MSG 10 will advise that the PIN code is to be changed). The user is then prompted at the end of MSG X to confirm that the user wishes to proceed (e.g., by entry of the PIN code once again). If the incorrect code is entered at step 722, a further preprogrammed message (MSG C) is played at step 724 advising that the updater routine has been terminated and the sequence proceeds to the end 726 (or, alternatively back to step 702 to await again entry of the PIN code to activate the updater system).

If, at step 722, the sequence is to proceed, the updated information is received (for a new counter-message, the information is either a voice recording for a new counter-message or a sequence of digits to restore a default counter-message, for example; and for the on-hold, response and PIN codes, the input is a sequence of digits or may be voice input if speech recognition is provided) at step 730 followed by an ending code which may either be a preset lapse of time with no information being entered or may be specific key stroke entries (e.g., the *# buttons) at step 732. After the ending code is inputted, the sequence plays at step 734 a preprogrammed Message Y advising that the new (where MSG 2 is for the counter-message; MSG 5 is for the on-hold code; MSG 8 is for the response code; and MSG 11 is for the PIN code) information is what was entered at step 730. The user is then prompted to confirm that the changed or updated information is correct at step 736 (e.g., by entering the # button for yes and the * button for no). If the answer is no, the sequence jumps back to step 720 to preperform the updating. If yes, at step 736, the sequence proceeds to step 738 to record and store the updated information as Code X (where Code 1 is for the counter message; Code 4 is for the on-hold code; Code 7 is for the response code and Code 10 is for the PIN Code ). The sequence then proceeds to optional step 740 to play a further preprogrammed message (MSG D) advising that the updater routine is concluded and proceeds to end at step 726 (or loops back to step 702 to await further instructions to update again, such as where handset 18C is off-hook).

Although shown as allowing for the user to modify any of the counter message, and on-hold, response and PIN codes, any one or more could be preprogrammed and/or unalterable by the user by deleting those items from the available options at step 706. Also, the counter-message and codes may be preprogrammed for initial use until changed by the user where that is permitted. Further, the z flag is available for any other variable message or code that may be desired, although the z flag could also be eliminated.

By virtue of the foregoing, there is thus provided a caller on-hold response system which is in the control of the consumer and which can alleviate the frustration and tedium of being put on hold by a receiving party.

While the present invention has been illustrated by description of a preferred embodiment, and while the illustrative embodiment has been described in considerable detail, it is not the intention of Applicant to restrict or in any way limit the scope of the appended claims to such detail. Additional advantages and modifications will readily appear to those skilled in the art. For example, although the message imposed on the telephone transmission link is referred to as a counter-message, there need not be a message from the receiving station to which to respond with the counter-message. Moreover, the counter-message could be dispensed with altogether. Also, while the on-hold response system of the present invention is particularly described in connection with situations where the receiving station initially and automatically places the call on-hold, the system of the present invention is equally applicable where the receiving station manually puts the call on-hold, including, by way of example, call-waiting systems and the like. The invention in its broader aspects is therefore not limited to the specific details, representative apparatus and method, and illustrative example shown and described. Accordingly, departures may be made from such details without departing from the spirit or scope of Applicant's general inventive concept.

Having described the invention what is claimed is:

1. In a telephone system wherein a caller's station is coupled via a telephone transmission link to a receiving station, a telephone on-hold response system for use by a caller in response to the receiving station being on-hold comprising:

hold control means available to the caller and coupled to the telephone transmission link for placing a call on-hold by said caller;

counter-message means for imposing a counter-message on the telephone transmission link whereby to be heard at the receiving station after the receiving station goes off-hold; and on-hold response detect means responsive to a characteristic signal indicating that the receiving station has gone off-hold for providing an indication to the caller thereof, whereby the caller may place the call off-hold for normal communication between the caller and the receiving station, the counter-message means further for imposing a counter-message on the telephone link after the on-hold response detect means responds to the characteristic signal indicating that the receiving station has gone off-hold whereby the receiving station will continue to hear a counter-message after going off-hold.

2. The telephone on-hold response system of claim 1 wherein the hold control means includes a switch coupled to the telephone transmission link.

3. The telephone on-hold response system of claim 2 wherein the caller's station includes a caller's handset, the switch being associated with the caller's handset.

4. The telephone on-hold response system of claim 1 wherein the counter-message means includes an electronic circuit which stores a programmed electronic counter-message.

5. The telephone on-hold response system of claim 1 wherein the counter-message means includes a message playback device which contains a recorded counter-message.

6. The telephone on-hold response system of claim 1 wherein the on-hold response detect means includes circuitry responsive to touch tone key characteristics.

7. The telephone on-hold response system of claim 1 further comprising a housing containing the hold control means, counter-message means, and on-hold response detect means.

8. The telephone on-hold response system of claim 7 wherein the caller's station includes a caller's handset which defines the housing such that the telephone on-hold response system is contained with the caller's handset.

9. The telephone on-hold response system of claim 1 further comprising an indicator responsive to the on-hold response detect means whereby to provide said indication to the caller.

10. The telephone on-hold response system of claim 9 wherein the indicator includes an audible sounding device.

11. The telephone on-hold response system of claim 9 wherein the indicator includes a visual indicator.

12. The telephone on-hold response system of claim 9 further comprising a housing containing the hold control means, counter-message means, on-hold response detect means, and indicator.

13. The telephone on-hold response system of claim 12 wherein the caller's station includes a caller's handset which defines the housing such that the telephone on-hold response system is contained with the caller's handset.

14. The telephone on-hold response system of claim 1 further comprising a program controlled computer system, the computer system being programmed to provide at least the counter-message means and the on-hold response detect means.

15. The telephone on-hold response system of claim 1, wherein a central office controls the telephone transmission link, the central office including a program controlled computer system, the computer system being programmed to provide at least the counter-message means and the on-hold response detect means.

16. The telephone on-hold response system of claim 15 wherein the computer system is further programmed to provide the hold control means.

17. The telephone on-hold response system of claim 16, the computer system being responsive to the caller's handset to activate the hold control means.

18. The telephone on-hold response system of claim 1 further including a caller's handset at the caller's station.

19. The telephone on-hold response system of claim 1, the counter-message means being adapted to impose the same counter-message before and after the on-hold response detect means responds to the receiving station going off-hold.

20. The telephone on-hold response system of claim 1, the counter-message means being adapted to impose a counter-message until the caller places the call off-hold.

21. In a telephone system wherein a caller's station is coupled via a telephone transmission link to a receiving station, a telephone on-hold response system for use by a caller in response to the receiving station being on-hold comprising:

hold control means available to the caller and coupled to the telephone transmission link for placing a call on-hold by said caller;

a program controlled computer system programmed to (a) impose a counter-message on the telephone transmission link whereby to be heard at the receiving station after the receiving station goes off-hold, (b) provide an indication to the caller that the receiving station has gone off hold in response to a characteristic signal indicative thereof, whereby the caller may place the call off-hold for normal communication between the caller and the receiving station, and (c) to impose a counter-message on the telephone transmission link after providing the indication to the caller whereby the receiving station will continue to hear a counter-message after going off-hold.

22. The telephone on-hold response system of claim 21 wherein the hold control means includes a switch coupled to the telephone transmission link.

23. The telephone on-hold response system of claim 21 wherein the computer system includes a reprogrammable memory containing said counter-message whereby to allow for alterations in the counter-message.

24. The telephone on-hold response system of claim 21 wherein a central office controls the telephone transmission link, the computer system being part of the central office.

25. The telephone on-hold response system of claim 21 wherein the computer system is programmed to further provide the hold control means.

26. The telephone on-hold response system of claim 25, the computer system being responsive to the caller's station to activate the hold control means.

27. The telephone on-hold response system of claim 21 wherein the computer system includes a microprocessor and a memory containing said programming.

28. The telephone on-hold response system of claim 21, the program controlled computer system further being programmed to impose the same counter-message before and after providing the indication to the caller.

29. The telephone on-hold response system of claim 21, the program controlled computer system further being programmed being program to impose a counter-message until the caller places the call off-hold.

30. A method of telephone on-hold response when a calling station is connected to a receiving station in an on-hold state, the method comprising:

responsive to the calling station, placing the call in a caller on-hold state;

emitting a counter-message to the receiving station in response to placing the call in the caller on-hold state;

monitoring for the receiving station to terminate its on-hold state;

detecting that the receiving station has terminated its on-hold state;

emitting a counter-message to the receiving station after detecting that the receiving station has terminated its on-hold state; and terminating the caller on-hold state in response to the receiving station terminating its on-hold state whereby normal communications may be undertaken between the calling handset and the receiving station.

31. The method of claim 30 further comprising modifying the counter-message.

32. The method of claim 30 further comprising terminating the counter-message upon terminating the caller on-hold state.

33. The method of claim 30 further comprising detecting a characteristic indicative of the receiving station terminating its on-hold state prior to terminating the caller on-hold state.

34. The method of claim 30 further comprising providing an indication that the receiving station has terminated its on-hold state.

35. The method of claim 30 wherein the caller on-hold state is terminated responsive to the calling station.

36. The method of claim 30 further comprising emitting the same counter-message before and after detecting that the receiving station has terminated its on-hold state.

37. The method of claim 30 further comprising providing a calling handset at the calling station and responsive to the calling handset, placing the call in a caller on-hold state.

38. The method of claim 30 further comprising providing a calling handset at the calling station, wherein the caller on-hold state is terminated responsive to the calling handset.

* * * * *